United States Patent [19]

Kim

[11] Patent Number: 5,585,846
[45] Date of Patent: Dec. 17, 1996

[54] IMAGE SIGNAL PROCESSING CIRCUIT IN A DIGITAL CAMERA HAVING GAIN AND GAMMA CONTROL

[75] Inventor: Sung-Hun Kim, Kyonggi, Rep. of Korea

[73] Assignee: Samsung Electronics Co., Ltd., Kyungki-do, Rep. of Korea

[21] Appl. No.: 495,113

[22] Filed: Jun. 27, 1995

Related U.S. Application Data

[63] Continuation of Ser. No. 985,970, Dec. 4, 1992, abandoned.

[30]    Foreign Application Priority Data

Dec. 5, 1991  [KR]   Rep. of Korea ............... 91-21761

[51] Int. Cl.$^6$ ............................................. H04N 5/202
[52] U.S. Cl. ........................ 348/254; 348/255; 348/674
[58] Field of Search ........................... 348/207, 222, 348/229, 254, 255, 362, 363, 364, 671, 674, 676, 678, 220; 358/519; H04N 5/202

[56]             References Cited

U.S. PATENT DOCUMENTS

| | | | |
|---|---|---|---|
| 4,691,253 | 9/1987 | Silver | 360/33.1 |
| 4,800,430 | 1/1989 | Murakami et al. | 358/160 |
| 4,970,594 | 11/1990 | Kitaura et al. | 358/172 |
| 4,994,916 | 2/1991 | Pshtissky | 358/181 |
| 5,089,890 | 2/1992 | Takayama | 358/164 |
| 5,103,298 | 4/1992 | Kashimura et al. | 358/32 |
| 5,130,814 | 7/1992 | Spencer | 358/335 |
| 5,142,365 | 8/1992 | Lim et al. | 358/169 |
| 5,221,963 | 6/1993 | Hashimoto et al. | 358/209 |
| 5,243,426 | 9/1993 | Murayama | 358/164 |
| 5,251,017 | 10/1993 | Riviere | 358/32 |
| 5,424,774 | 6/1995 | Takayama et al. | 348/222 |
| 5,457,494 | 10/1995 | Suga et al. | 348/229 |

*Primary Examiner*—John K. Peng
*Assistant Examiner*—Ngoc-Yen Vu
*Attorney, Agent, or Firm*—Sughrue, Mion, Zinn, Macpeak & Seas

[57]            ABSTRACT

A digital camera for processing a digital signal. The camera includes an image signal processing circuit which uses a low-resolution analog-to-digital converter. The processing circuit performs AGC and gamma control on both digital and analog signals. Gain control and gamma control are performed by auto gain controllers which either process an analog signal prior to converting the analog signal to a digital signal or after the analog signal is converted to a digital signal. The image signal processing circuit performs processing based on the output of one of a m-bit output of an AGC/gamma controller and a m-bit output of an A/D converter. The AGC/gamma controller receives an n-bit clamped image signal from a clamper, while the m-bit A/D converter receives an analog input. This selection operation minimizes the need for a high-resolution A/D converter.

12 Claims, 1 Drawing Sheet

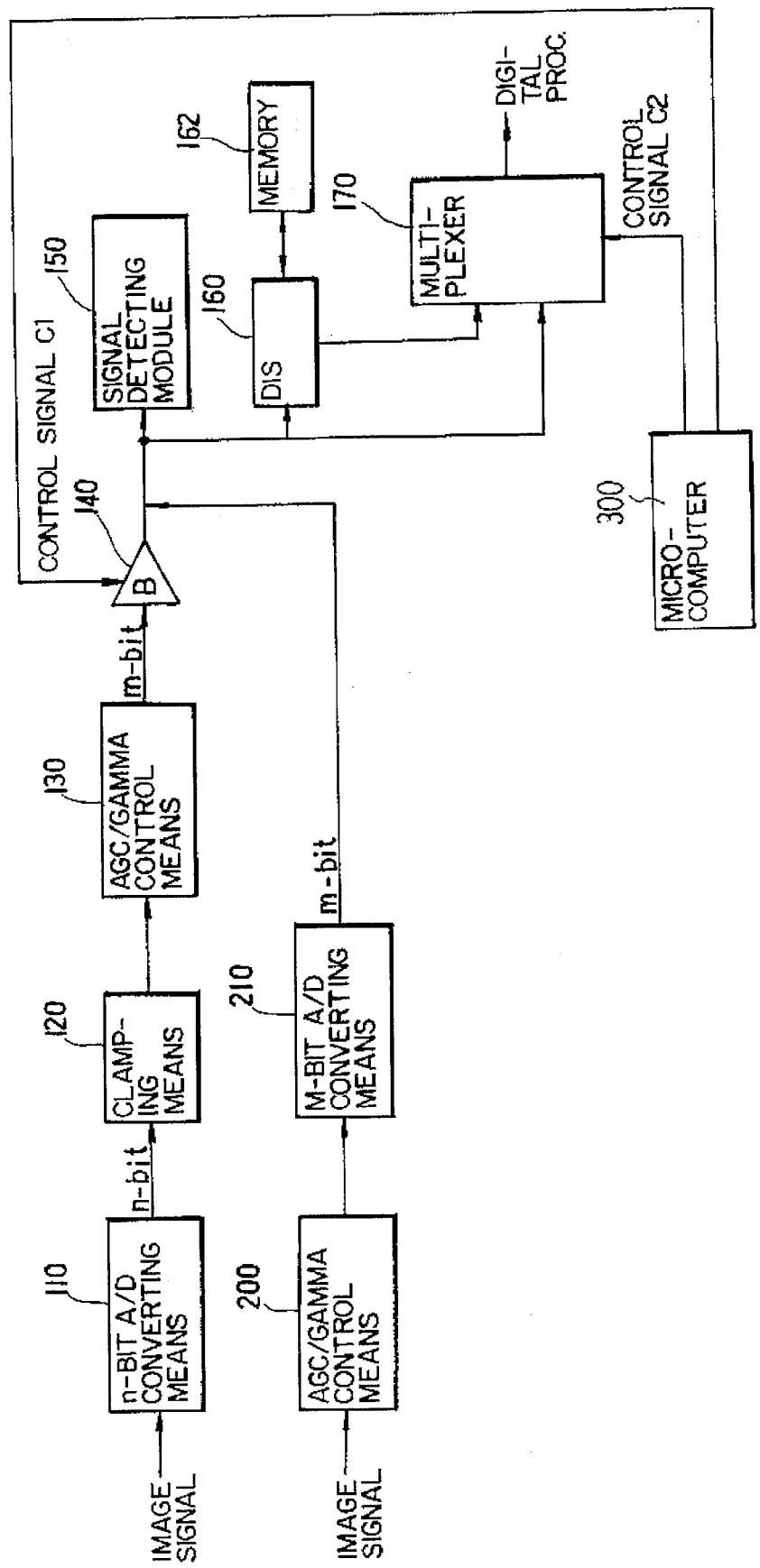

IMAGE SIGNAL PROCESSING CIRCUIT IN A DIGITAL CAMERA HAVING GAIN AND GAMMA CONTROL

This is a continuation of Application No. 07/985,970 filed Dec. 4, 1992, now abandoned.

FIELD OF THE INVENTION

The present invention relates to a digital camera for processing digital signals, and more particularly to an image signal processing circuit for performing gain control and gamma control of an image signal. The invention provides gain and gamma control based on either, analog or digital image signals.

BACKGROUND OF THE INVENTION

Conventional digital cameras convert an incoming analog image signal to a digital signal and, prior to processing, clamp the digital image signal. The conventional digital camera uses an auto gain controller (AGC) to perform gain control and gamma control based on the clamped signal. Prior to performing gamma control, the conventional system must secure a dynamic range for subsequent signal processing. The conventional system required a larger dynamic range, to perform gain and gamma control, than that needed for subsequent processing. Thus, a high resolution A/D converter is required to output a sufficent number of bits to secure the dynamic range, even though fewer bits are needed for subsequent processing.

In many circumstances, the cost of an overall system increases as the number of bits processed by the A/D converter increases. For instance, some conventional digital cameras use extremely costly high-resolution A/D converters. Thus, less costly components can be used, if the resolution of the A/D converter is decreased. Divergently, in other circumstances, the cost of an overall system decreases as the number of bits processed by the A/D converter increases. Thus, a less costly system is achieved when using a lower resolution A/D converter.

SUMMARY OF THE INVENTION

It is an object of the present invention to provide an image signal processing circuit which allows a user to select between low-resolution and high-resolution A/D converters.

It is another object of the present invention to provide an image signal processing circuit in a digital camera which uses one of high and low resolution A/D converters in connection with the gain and gamma control circuits.

It is another object of the present invention to provide an image signal processing circuit that performs gain and gamma control based on both, digital and analog signals.

In order to achieve the above-referenced objects, the present invention comprises means for performing AGC/gamma control based on an analog image signal and a first A/D converter to convert an image signal output by the AGC/gamma controller to a m-bit digital signal. The invention also comprises a second A/D converter for converting an image signal to a digital signal, means for clamping the digital signal and means for performing AGC/gamma control based on the clamped digital signal. The signals digitized at the first and second A/D converters are selectively input to, and processed by, a signal detect module, a DIS (digital image stabilizer) and a multiplexer.

The above and other objects, features and advantages of the present invention will become more apparent from the following description taken in conjunction with the accompanying drawing illustrating a preferred embodiment of the present invention.

BRIEF DESCRIPTION OF THE DRAWING

FIG. 1 is a block diagram of an image signal processing circuit of a digital camera in accordance with the present invention.

DETAILED DESCRIPTION OF THE INVENTION

FIG. 1 illustrates an image processing circuit of a camera that receives an image input signal from an image tube (not shown) of the camera based on an object. The analog image signal is input to one of a n-bit A/D converting means 110 and an AGC/gamma control means 200. The A/D converting means 110 converts the incident image signal to a n-bit digital signal, which is input to a clamping means 120. The clamping means 120 fixes the signal levels of the digital signal to a predetermined potential. The digital signal fixed to the predetermined potential is input to an AGC/gamma control means 130, which automatically controls the gain of the digital signal input from the clamping means. The control means 130 also performs gamma control. The AGC/gamma control means 130 receives a n-bit signal and outputs a m-bit signal, wherein m is less than n.

In the preferred embodiment, a n-bit digital signal is required by the A/D converting means 110 to secure the dynamic range, while m-bits are output by the AGC/gamma control means 130 to perform gamma control. Accordingly, the number of n-bits may be greater than or equal to the number of m-bits.

The m-bit digital signal output by the AGC/gamma control means 130 is input to a three-state buffer 140. The three-state buffer 140, during normal operation, is turned ON by a control signal C1 input from a microcomputer 300. The three-state buffer 140 is turned ON and OFF by the user via the microcomputer and control signal C1. Signal processing is performed on the digital signal once the three-state buffer 140 is turned ON by the control signal C1 output from the microcomputer. Thereafter, a m-bit digital image signal output from the AGC/gamma control means 130 is input to the signal detect module 150, the DIS 160 and the multiplexer 170.

The signal detect module 150 performs multiple detecting functions for generating various signals, e.g., the signal detecting function for generating an iris control function. The DIS performs special screen processing, stores data from the special screen processing in memory 162, reads data from the memory 162 and outputs this data to the multiplexer 170. The multiplexer 170 selects one of the m-bit digital signal from the three-state buffer and the data output from the DIS 160 in accordance with a control signal C2 from the microcomputer 300. The output of the multiplexer 170 is supplied to a digital processor.

As noted above, the image signal from the image tube (not shown) of the camera is also input to an AGC/gamma control means 200. The AGC/gamma control means 200 performs gain and gamma control based directly on the analog image input signal. The image signal from the AGC/gamma control means 200 is input to a m-bit A/D converting means 210 which converts the analog image signal to a m-bit digital signal.

As the image signal input to the AGC/gamma control means 200 does not need the security of a n-bit dynamic range, the image signal can be converted to a digital signal with a lower resolution m-bit A/D converting means 210. The m-bit A/D converting means 210 converts the analog image signal output from the AGC/gamma control means 200 to a m-bit digital signal.

When an image signal is supplied to the AGC/gamma control means 200, the microcomputer operates to turn OFF the three-state buffer 140 with the control signal C1. Accordingly, the m-bit digital signal converted at the m-bit A/D converting means 210 is input to the signal detect module 150, the DIS 160 and the multiplexer 170, respectively. The multiplexer 170 selects one of the m-bit digital signal output from the m-bit A/D converting means 210 and the data output by the DIS 160 based on a control signal C2. The output of the multiplexer is supplied to the digital processor.

As seen from the foregoing, the image signal processing circuit of the digital camera according to the present invention selects between the n-bit A/D converting means 110 and the m-bit A/D converting means 210 based on a control signal C1. The present invention also selects between the AGC/gamma control means 130 and the AGC/gamma control means 200 based on this control signal C1.

When the clamping means 120, AGC/gamma control means 130, three-state buffer 140, signal detect module 150, DIS 160, memory 162 and multiplexer 170 are formed as an integral circuit, this circuit is selectively connected to an input from the n-bit A/D converting means 110 or the AGC/gamma control means 200 and the m-bit A/D converting means 210. As shown above, the image signal processing circuit of the digital camera according to the present invention can perform AGC/gamma control based on analog or digital signals.

Although the invention has been described in detail with reference to its presently preferred embodiment, it will be understood by one of ordinary skill that the spirit and scope of the invention are not limited to this embodiment. For instance, while the preferred embodiment uses a three-state buffer, the object of the present invention can be accomplished by other control means in the output control.

What is claimed is:

1. An image signal processing circuit of a digital camera, comprising:

clamping means for fixing an n-bit digital image signal to a predetermined potential, said n-bit digital image signal corresponding to an output from an external image source;

first AGC/gamma control means for performing gain and gamma control based on a clamped n-bit digital signal output by said clamping means, said AGC/gamma control means outputting a first m-bit digital signal;

a buffer for receiving and selectively outputting said first m-bit digital signal output by said AGC/gamma control means; and signal processing means for processing one of said first m-bit digital signal output from said buffer and a second m-bit digital signal input from said external image source without being processed by said clamping means.

2. An image signal processing circuit of a digital camera as defined in claim 1, further including n-bit analog-to-digital converting means, connected between said external image source and said clamping means, for converting an input analog image signal from said external image source to said n-bit digital image signal.

3. An image signal processing circuit of a digital camera as defined in claim 2, wherein said signal processing means includes:

a digital image stabilizer for reading memory, storing in memory and outputting from memory special screen processing data in order to perform a special screen process; and a multiplexer for selecting one of said first m-bit digital signal output from said buffer, said second m-bit digital signal input from said external image source, and said special screen processing data from said digital image stabilizer based on a control signal from a microcomputer, and for output of selected data to a digital processor.

4. An image signal processing circuit of a digital camera as defined in claim 1, further comprising:

m-bit analog-to-digital converting means, connected between said external image source and said signal processing means, for converting said input analog image signal to said second m-bit digital signal, and second AGC/gamma control means between said external image source and said m-bit analog-to-digital converting means, for performing gain and gamma control based on said input analog image signal.

5. An image signal processing circuit of a digital camera as defined in claim 4, wherein said signal processing means includes:

a digital image stabilizer for reading memory, storing in memory and outputting from memory special screen processing data in order to perform a special screen process; and a multiplexer for selecting one of said first m-bit digital signal output from said buffer, said second m-bit digital signal input from said m-bit analog to digital converting means, and said special screen processing data from said digital image stabilizer based on a control signal from a microcomputer, and for output of selected data to a digital processor.

6. An image signal processing circuit of a digital camera as defined in claim 1, wherein said signal processing means includes:

a digital image stabilizer for reading memory, storing in memory and outputting from memory special screen processing data in order to perform a special screen process; and a multiplexer for selecting one of said first m-bit digital signal output from said buffer and said second m-bit digital signal input from said external image source and said special screen processing data from said digital image stabilizer based on a control signal from a microcomputer and for output of selected data to a digital processor.

7. An image signal processing circuit of a digital camera as defined in claim 1, wherein a number of bits in said m-bit digital image signal is less than a number of bits in said n-bit digital image signal.

8. An image signal processing circuit of a digital camera, comprising:

a first signal path receiving an input image signal, said first signal path defined by a first analog-to-digital converter and a digital gamma control circuit arranged in that order; and a second signal path receiving said input image signal, said second signal path defined by an analog gamma control circuit and a second analog-to-digital converter arranged in that order;

wherein an operational one of said first signal path and said second signal path is based on a characteristic of said image signal.

9. The image signal processing circuit of a digital camera as recited in claim 8, wherein said characteristic of said image signal is a dynamic range of said image signal.

10. The image signal processing circuit of a digital camera as recited in claim 8, wherein said first signal path further comprises a clamping circuit operatively connected between said converter and said digital gamma control circuit.

11. The image signal processing circuit of a digital camera as recited in claim 8, wherein said first signal path further comprises a buffer receiving input from said digital gamma control circuit, said buffer being switched between and ON state and an OFF state responsive to a dynamic range of said image signal.

12. The image signal processing circuit of a digital camera as recited in claim 8, wherein said first signal path and said second signal path provide respective first and second m-bit digital signals.

\* \* \* \* \*